United States Patent [19]

Owa

[11] 4,023,084

[45] May 10, 1977

[54] CONTROL APPARATUS FOR A MACHINE TOOL

[75] Inventor: Kaoru Owa, Kariya, Japan

[73] Assignee: Toyoda Koki Kabushiki Kaisha, Japan

[22] Filed: Oct. 9, 1975

[21] Appl. No.: 621,077

[30] Foreign Application Priority Data

Oct. 9, 1974 Japan .......................... 49-116709

[52] U.S. Cl. ............................. 318/603; 318/571; 51/165.77

[51] Int. Cl.² ....................................... G05B 19/24

[58] Field of Search ................. 318/603, 571, 600; 51/165.77

[56] References Cited

UNITED STATES PATENTS

| | | | |
|---|---|---|---|
| 3,699,720 | 10/1972 | Lenning | 318/571 UX |
| 3,840,792 | 10/1974 | Yokoe | 318/603 |
| 3,934,185 | 1/1976 | Schoonouer | 318/603 |
| 3,940,675 | 2/1976 | Schroeder | 318/603 |

*Primary Examiner*—B. Dobeck
*Attorney, Agent, or Firm*—Oblon, Fisher, Spivak, McClelland & Maier

[57] ABSTRACT

A control apparatus for a machine tool having a tool support supporting a tool for machining a workpiece and movable relative to the workpiece through a feed screw is disclosed. When the tool support is moved to a position in the vicinity of an original position, a signal indicator generates an output signal. In response to the output signal, one of reference pulses generated in response to the relation of the feed screw is specified to define the original position. A digital switch sets a distance between the original position and a start position. The tool support is moved toward the workpiece by the distance set by the digital switch from the original position defined by the specified reference pulse.

5 Claims, 5 Drawing Figures

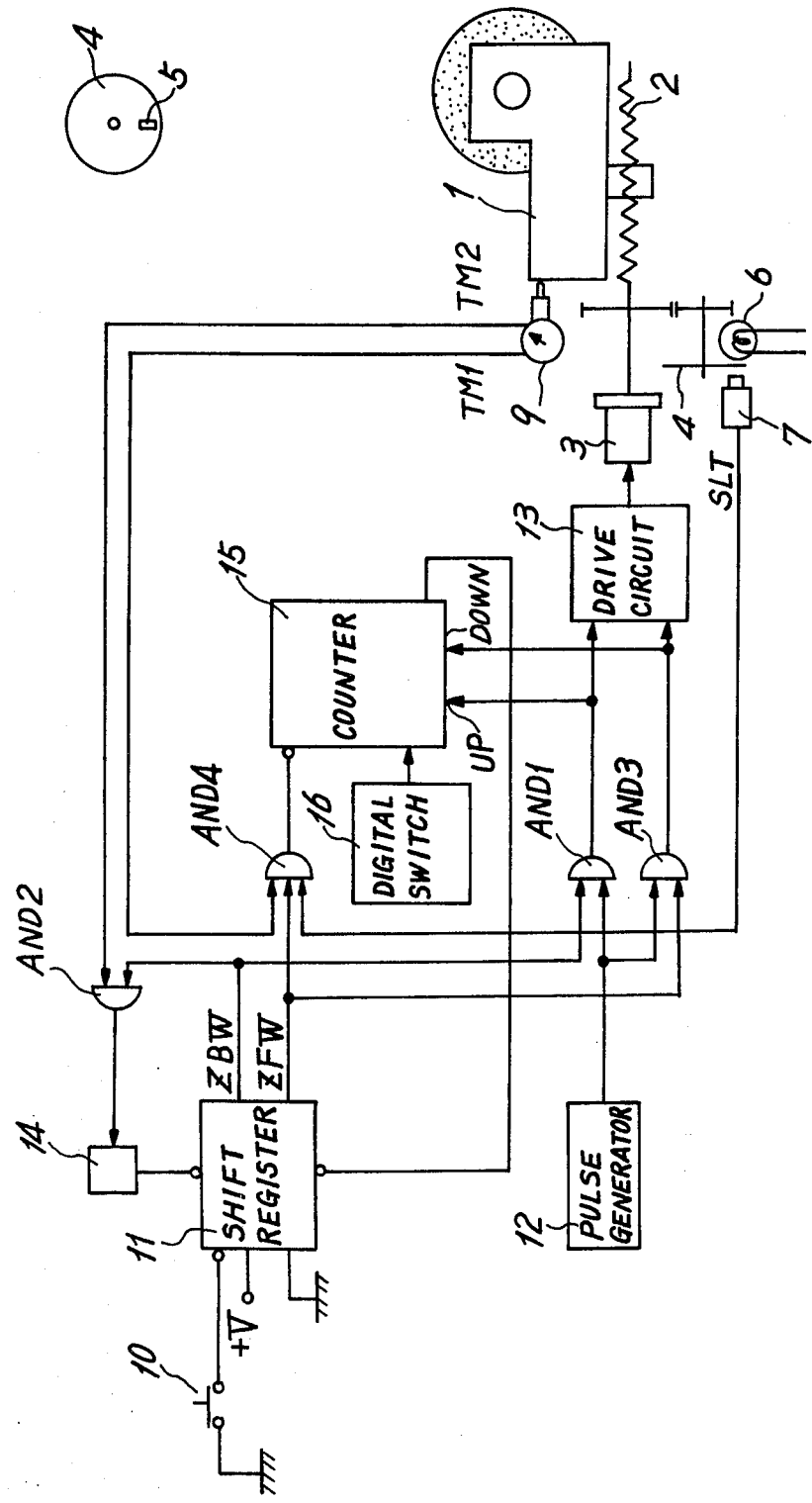

CONTROL APPARATUS FOR A MACHINE TOOL

BACKGROUND OF THE INVENTION

1. Field of the Invention

The present invention relates to a control apparatus for a machine tool capable of positioning a tool support to a start position with high accuracy.

2. Description of the Prior Art

In the past, the return of a movable member, such as a wheel support, in a grinding machine to a start position has been performed by using as a reference position a start position and by actuating a limit switch which is fixed to the bed of the grinding machine by the wheel support. A disadvantage with the prior art arrangement is that because the start position is fixed to the bed the distance between a workpiece and a grinding wheel on the wheel support retracted to the start position cannot be changed easily in accordance with the change in the diameter of a workpiece to be ground.

Furthermore, the wheel support cannot be positioned at the start position with high accuracy because of operation error of the limit switch.

SUMMARY OF THE INVENTION

It is therefore an object of the present invention to provide a control apparatus for a machine tool capable of positioning a tool support to a start position with high accuracy.

Briefly, in accordance with the present invention, the foregoing and other objects are attained by the provision of a control apparatus wherein one of a plurality of reference pulses generated in response to the rotation of a feed screw is specified to define an original position in response to an output signal generated when a tool support is moved to a position in the vicinity of the original position to thereby position the tool support to a start position with high accuracy.

BRIEF DESCRIPTION OF THE DRAWINGS

Various objects, features and attendant advantages of the present invention will be more fully appreciated as the same becomes better understood from the following detailed description of the present invention, when considered in connection with the accompanying drawings in which:

FIG. 1 is a control circuit diagram of a preferred embodiment according to the present invention;

FIG. 2 is a front view of a split plate used in the embodiment of FIG. 1;

DETAILED DESCRIPTION OF PREFERRED EMBODIMENTS

Figure 5:
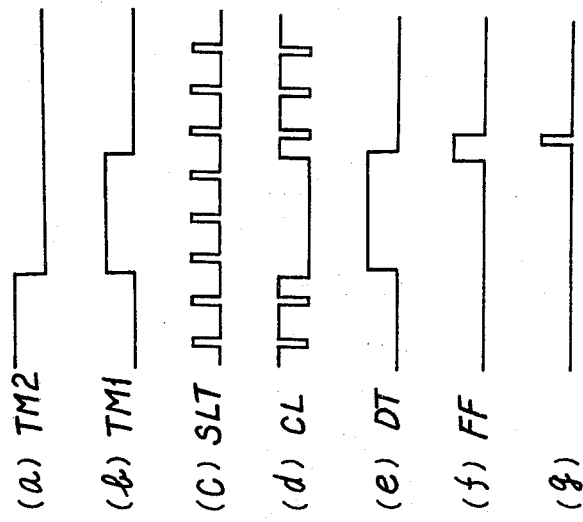
FIG. 5 shows various outputs of the elements shown in FIG. 4.

Referring now to the drawings, wherein like reference numbers refer to identical or corresponding parts throughout the several views and more particularly to FIG. 1 thereof, wherein is shown a wheel support 1 which is slidably mounted on a bed, not shown, and rotatably supports a grinding wheel for grinding a workpiece, not shown. The wheel support 1 is threadally engaged with a feed screw 2 which is rotated by a stepping motor 3 fixed to the bed. A slit thereof is drivingly connected by gears to the feed screw 2. On opposite sides of the slit plate 4, there are located a light source 6 and a phototransistor 7 which are aligned with each other in such a manner that the phototransistor 7 receives a photobeam from the light source 6 generate a reference pulse SLT for every rotation of the split plate 4 or unit rotational movement of the feed screw 2.

A signal indicator as a position detecting device, such as "TRIMETRON" available from CITIZEN WATCH CO., Tokyo, Japan, is mounted on the bed and generates a first output signal TM1 when the wheel support 1 is retracted to a position in the vicinity of an original position and a second output signal TM2 when the wheel support 1 is further retracted. The original position is defined as a reference position of the wheel support 1 in returning the wheel support 1 to a start position.

The start position is defined as a position from which the wheel support 1 is started towards a workpiece to grind the same at various feed speeds in normal grinding cycles and as a position to which the wheel support 1 is retracted from a grinding position against the workpiece after the grinding operation is completed in order to permit a safe change of workpieces.

A switch 10 for retraction of the wheel support 1 is connected to a load terminal of a shift register 11. The shift register 11 receives a reference voltage $+V$ at the first set terminal thereof such that when an input is applied to the load terminal of the shift register 11, upon depression of the switch 10, the shift register 11 will generate a signal $Z\overline{BW}$ for retraction from the first output terminal thereof. The signal $Z\overline{BW}$ is fed to an AND circuit. AND 1 in order to apply a train of pulses form a pulse generator 12 to a terminal for reverse rotation of a stepping motor driving circuit 13 to thereby rotate the stepping motor 3 in a reverse direction to retract the wheel support 1. The signal $Z\overline{BW}$ is also fed to an AND circuit AND 2 which also receives the second output signal TM2 from the signal indicator 9. An output of the AND circuit AND 2 is fed through a pulse forming circuit 14 to a shift clock terminal of the shift register 11 so that the shift register 11 is shifted to generate a signal $Z\overline{FW}$ for advance at the second output terminal thereof.

The signal $Z\overline{FW}$ is fed to an AND circuit AND 3 in order to apply a train of pulses from the pulse generator 12 to a terminal for forward rotation of the stepping motor driving circuit 13 to thereby rotate the stepping motor 3 in a forward direction. The signal $Z\overline{FW}$ is also fed to an AND circuit AND 4 which receives the first output signal TM1 from the signal indicator 9 and the reference pulse SLT from the phototransistor 7. An output of the AND circuit AND 4 is fed to a load terminal of a reversible counter 15 so that the content of a digital switch 16 is preset in the reversible counter 15. The content of the digital switch 16 designates a distance A between the original position and the start position of the wheel support 1. A UP terminal for addition and a DOWN terminal for subtraction of the reversible counter 15 are connected to the output terminals of the AND circuits AND 1 and AND 3, respectively. A zero terminal of the reversible counter 15 is provided for generating an output signal when the content of the reversible counter 15 becomes zero and is connected to a reset terminal of the shift register 11.

The operation of the above embodiment will now be described.

When the switch 10 is depressed in order to position the wheel support 1 to the start position, the shift register 11 is set to generate the signal ZBW̄ from the first output terminal thereof. The signal ZBW̄ is fed to the AND circuit AND 1 to apply a train of pulses from the pulse generator 12 to the terminal for reverse rotation of the stepping motor drive circuit 13 so that the stepping motor 3 is rotated in a reverse direction to thereby retract the wheel support 1.

Figure 3:
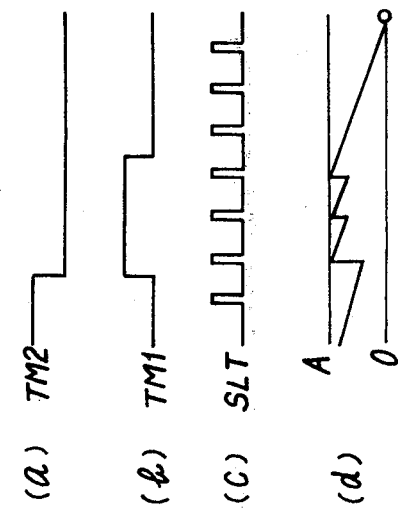
FIG. 3 shows various outputs of the elements shown in FIG. 1.

When the signal indicator 9 generates the second output signal TM2 (see (a) in FIG. 3) by retraction of the wheel support 1, the output of the AND circuit AND 2 is fed through the pulse forming circuit 14 to the shift clock terminal of the shift register 11 so that the shift register 11 is shifted to generate the signal ZFW̄ from the second output terminal thereof. The signal ZFW̄ is fed to the AND circuit AND 3 to apply a train of pulses from the pulse generator 12 to the terminal for forward rotation of the stepping motor drive circuit 13 so that the stepping motor 3 is rotated in a forward direction to thereby advance the wheel support 1 through the feed screw 2. Since the slit plate 4 is rotated in accordance with rotation of the feed screw 2, the reference pulse SLT is generated from the phototransistor 7 for every unit rotational movement of the feed screw 2, as shown at (c) in FIG. 3.

When the first output signal TM1 is generated from the signal indicator 9 during the advance movement of the wheel support 1, the output of the AND circuit AND 4 is fed to the load terminal of the reversible counter 15 each time the reference pulse SLT is generated whereby the content of the digital switch 16 is repeatedly preset into the reversible counter at every generation of the reference pulse SLT, as shown at (d) in FIG. 3. When the signal indicator 9 stops generating the first output signal TM1 by further advance movement of the wheel support 1, the AND circuit AND 4 is closed so that the applying of the output from the AND circuit AND 4 to the load terminal of the reversible counter 15 is stopped. Accordingly, the content of the digital switch 16 is finally preset in the reversible counter 15 at the time when the reference pulse SLT is generated just before the first output signal TM1 disappears. When this specified reference pulse SLT is generated, the wheel support 1 is positioned at the original position.

In this manner, even if a plurality of reference pulses SLT are generated while the first output signal TM1 is generated, one of the reference pulses is specified in accordance with the first output signal TM1 and this specified reference pulse is utilized to define the original position of the wheel support 1. Therefore, in accordance with the present invention it is seen that no complicated or troublesome operations are required to generate a single reference pulse during the generation of the first output signal TM1.

A train of pulses from the pulse generator 12 are fed to the terminal for forward rotation of the stepping motor drive circuit 13 and to the DOWN terminal for subtraction of the reversible counter 15 to subtract the content thereof. When the wheel support 1 is advanced from the original position by the amount A preset by the digital switch 16, the content of the reversible counter 15 becomes zero so that the output is generated from the zero terminal of the reversible counter 15. The output from the zero terminal is fed to the reset terminal of the shift register 11 to be reset the same so that the signal ZFW̄ disappears at the second output terminal of the shift register 11. Accordingly, the wheel support 1 is accurately positioned at the start position, distant from the original position by a predetermined distance. Furthermore, the start position of the wheel support 1 can be arbitrally changed by merely changing the content of the digital switch 16 in accordance with the change in diameter of a workpiece to be ground.

Figure 4:
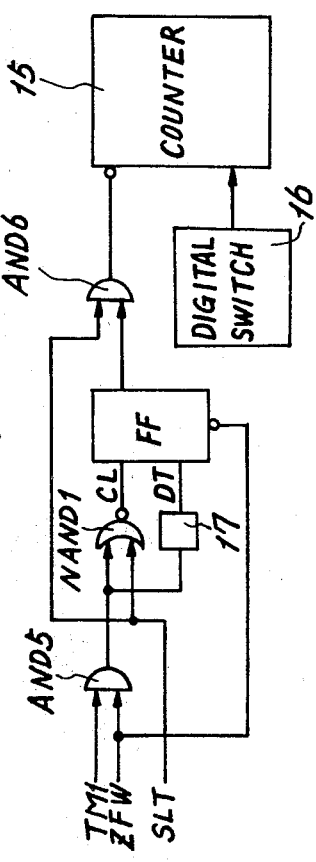
FIG. 4 is a partial control circuit diagram of another preferred embodiment according to the present invention.

Referring to FIGS. 4 and 5, another preferred embodiment will be described wherein the content of the digital switch 16 is preset in the reversible counter 15 at the time when the reference pulse SLT is generated just after the first output signal TM1 disappears.

The first output signal TM1 from the signal indicator 9 and the signal ZFW̄ from the shift register 11 are fed to an AND circuit AND 5. An output of the AND circuit AND 5 is fed to a clock terminal CL and a data terminal DT of a D-type flip-flop FF through a NAND circuit NAND 1 and a delay circuit 17, respectively. The reference pulse SLT from the phototransistor 7 is fed to the clock terminal CL of the flip-flop FF through the NAND 1. Accordingly, the flip-flop FF is set at the time when the first output signal TM1 disappears and is reset at the time when the reference pulse SLT is fed to the clock terminal thereof through the NAND circuit NAND 1 just after the first output signal TM1 disappears, as shown at (f) in FIG. 5. An output of the flip-flop FF and the reference pulse SLT are fed to an AND circuit AND 6. Accordingly, an output is generated from the AND circuit AND 6 at the time when the reference pulse is generated just after the first output signal TM1 disappears, as shown at (g) in FIG. 5. The output from the AND circuit AND 6 is fed to the load terminal of the reversible counter 15 to preset the content of the digital switch 16 into the reversible counter 15. Accordingly, in this embodiment, the reference pulse SLT, just after disappearance of the first output signal TM1, defines the original position of the wheel support 1. Thereafter, the wheel support 1 is advanced to the start position in the same manner as in the first embodiment.

Obviously, numerous modifications and variations of the present invention are possible in light of the above teachings. It is therefore to be understood that within the scope of the teachings herein and the appended claims the invention may be practiced otherwise than as specifically described herein.

What is claimed as new and desired to be secured by Letters Patent of the United States is:

1. Control apparatus for a machine tool having a tool support supporting a tool for machining a workpiece and movable relative to said workpiece through a feed screw comprising:
   pulse generating means for generating a train of pulse signals;
   a drive motor for rotating said feed screw to move said tool support relative to said workpiece in response to said pulse signals;
   means for generating a reference pulse for every unit rotational movement of said feed screw;
   means for causing said drive motor to be actuated to move said tool support away from said workpiece;
   detecting means for generating an output signal when said tool support is moved in the vicinity of an original position;

means for specifying one of said reference pulses in response to said output signal from said detecting means to define said original position;

means for digitally setting a distance between said original position and a start position; and means for causing said drive motor to be actuated to move said tool support toward said workpiece by the distance set by said digitally setting means from said original position defined by the specified reference pulse.

2. Control apparatus for a machine tool having a tool support supporting a tool for machining a workpiece and movable relative to said workpiece through a feed screw comprising:

pulse generating means for generating a train of pulse signals;

a drive motor for rotating said feed screw to move said tool support relative to said workpiece in response to said pulse signals;

means for generating a reference pulse for every unit rotational movement by said feed screw;

means for causing said drive motor to be actuated to move said tool support away from said workpiece;

detecting means for generating a first output signal when said tool support is moved away from said workpiece to a position in the vicinity of an original position and for generating a second output signal when said tool support is further moved away from said workpieces;

means responsive to said second output signal from said detecting means for causing said drive motor to be actuated to move said tool support toward said workpiece;

means for specifying one of said reference pulses generated just before said first output signal from said detecting means disappears to define an original position;

means for digitally setting a distance between said original position and a start position; and counter means responsive to said specified reference pulse for counting the number of said pulse signals supplied to said drive motor to stop the movement of said tool support toward said workpiece when the counted number of said pulse signals coincides with the content of said setting means.

3. Control apparatus as claimed in claim 2, wherein said specifying means comprises AND circuit means responsive to said first output signal and said reference pulses to generate said specified reference pulse.

4. Control apparatus for a machine tool having a tool support supporting a tool for machining a workpiece and movable relative to said workpiece through a feed screw comprising:

pulse generating means for generating a train of pulse signals;

a drive motor for rotating said feed screw to move said tool support relative to said workpiece in response to said pulse signals;

means for generating a reference pulse for every unit rotational movement of said feed screw;

means for causing said drive motor to be actuated to move said tool support away from said workpiece;

detecting means for generating a first output signal when said tool support is moved away from said workpiece to a position in the vicinity of an original position and for generating a second output signal when said tool support is further moved away from said workpiece;

means responsive to said second output signal from said detecting means for causing said drive motor to be actuated to move said tool support toward said workpiece;

means for specifying one of said reference pulses generated just after said first output signal from said detecting means disappears to define an original position;

means for digitally setting a distance between said original position and a start position; and counter means responsive to said specified reference pulse for counting the number of said pulse signals supplied to said drive motor to stop the movement of said tool support toward said workpiece when the counted number of said pulse signals coincides with the content of said setting means.

5. Control apparatus as claimed in claim 4, wherein said specifying means comprises:

NAND circuit means responsive to said first output signal and said reference pulses;

delay circuit means responsive to said first output signal;

flip-flop circuit means including a clock terminal for receiving an output from said NAND circuit means and a data terminal for receiving an output from said delay circuit means; and AND circuit means responsive to an output from said flip-flop circuit means and said reference pulses to generate said specified reference pulse.

* * * * *